United States Patent [19]

Sakaki et al.

[11] Patent Number: 5,587,411
[45] Date of Patent: Dec. 24, 1996

[54] RUBBER COMPOSITION AND METHOD OF PRODUCING RUBBER PRODUCTS USING THE SAME COMPOSITION

[75] Inventors: Toshiaki Sakaki, Kakogawa; Shinichi Nakade, Itami, both of Japan

[73] Assignee: Sumitomo Rubber Industries, Ltd., Kobe, Japan

[21] Appl. No.: 158,992

[22] Filed: Nov. 30, 1993

[30] Foreign Application Priority Data

Dec. 1, 1992 [JP] Japan .................................. 4-322082

[51] Int. Cl.$^6$ .................................................. C08L 89/00
[52] U.S. Cl. .............................. 524/17; 524/20; 524/21; 524/25; 524/155; 524/156; 524/157
[58] Field of Search ............................... 524/17, 20, 21, 524/25, 155, 156, 157, 925, 926

[56] References Cited

U.S. PATENT DOCUMENTS

| | | | |
|---|---|---|---|
| 1,683,863 | 9/1928 | Campbell | 524/21 |
| 1,683,864 | 9/1928 | Campbell | 524/20 |
| 1,729,707 | 10/1929 | Campbell | 524/21 |
| 2,051,338 | 9/1936 | Isaacs | 524/926 |
| 2,203,701 | 6/1940 | Shepherd | 524/25 |
| 2,248,480 | 7/1941 | Morris | 524/926 |
| 2,450,579 | 10/1948 | Brown | 524/25 |
| 2,658,044 | 11/1953 | Anderson | 524/17 |
| 2,931,845 | 4/1960 | Lehmann et al. | 524/17 |
| 3,300,541 | 1/1967 | Latty | 524/25 |

FOREIGN PATENT DOCUMENTS 960880  6/1964  United Kingdom ..................... 524/25

*Primary Examiner*—Edward J. Cain
*Attorney, Agent, or Firm*—Nikaido Marmelstein Murray & Oram LLP

[57] ABSTRACT

This invention presents a rubber composition wherein a determined amount of protein is mixed with unvulcanized rubber. Rubber products made of this rubber composition have sufficient strength for practical use and are harmless to human bodies. The rubber composition of the invention not requiring vulcanizing process is advantageous in eliminating the need of large-scale vulcanizing equipment. Combined use of a curing agent and protein will increase modulus higher than using the curing agent alone.

2 Claims, No Drawings

RUBBER COMPOSITION AND METHOD OF PRODUCING RUBBER PRODUCTS USING THE SAME COMPOSITION

FIELD OF THE INVENTION

The present invention relates to a rubber composition containing protein and a method of producing rubber products using the same composition, or more particularly to the rubber composition which, whether unvulcanized or vulcanized at low density, is given sufficient strength for practical use by containing protein therein and to the method of producing rubber products using the same composition.

BACKGROUND OF THE INVENTION

Conventionally, natural rubber and synthetic rubbers has been vulcanized. Vulcanization means producing bridged structure among rubber molecules by using a curing agent mixed with the crude rubber. Vulcanization increases elasticity of the rubber, giving sufficient strength for practical use. Known curing methods include sulfur cure, peroxide cure and radiation cure.

However, rubber products using the above curing methods have the following problems. When rubber products by sulfur cure are used in acid solution, zinc ion may be eluted from zinc oxide which was added during production process. Furthermore, because of some vulcanization accelerators, the rubber product itself may cause skin irritation.

If rubber products are made of rubber prepared by peroxide cure, the products themselves may cause skin irritation because peroxide has a property of irritating skin.

Rubber products made of rubber prepared by radiation cure are quite harmful to human bodies because they contain carbon tetrachloride or organic multifunctional monomers as a cross linking agent.

When the rubber products made of the rubbers vulcanized by any of the curing methods are used in direct contact with the human bodies, particularly when they are used in the human bodies, they have a fatal drawback of being harmful. Whereas unvulcanized rubbers do not have the above harmfullness because any curing agent is not added to them. However, the unvulcanized rubbers cannot achieve sufficient strength, and so a single substance of them is rarely used as a structural material.

Further improvement in the modulus of the vulcanized rubber is sometimes required. In this case, the above vulcanizations cannot give sufficient modulus to the rubber.

SUMMARY OF THE INVENTION

A main object of the present invention is to overcome the technical problems mentioned above, and to present a rubber composition enabling production of rubber products which is harmless to human bodies and is strong enough for practical use, and a method of producing rubber products using the same composition.

Another object of the invention is to present a rubber composition which without using a filler, enables production of rubber products having a higher modulus than conventionally vulcanized rubbers, and a method of producing rubber products using the same composition.

After continued efforts and study for achieving the above objects, the inventors have found an surprising fact that when a certain amount of protein is mixed with rubber, the rubber may have a sufficient strength for practical use even though it is not vulcanized. Thus the inventors have completed the present invention.

The rubber composition of the invention is characterized by mixing 1 to 20 parts by weight of protein in solid with 100 parts by weight of rubber.

The method of producing rubber products according to the invention is characterized by that after mixing an aqueous solution of protein to rubber latex in a ratio of 1 to 20 parts by weight of protein in solid to 100 parts by weight of rubber in solid, and the resultant mixture is dried and molded.

In the present invention, the reason why mixing protein with rubber will enhance the strength of the unvulcanized rubber is not clearly known. It, however, is presumed that protein may act as a kind of reinforcing agent and at the same time it may bridge rubber molecules to some extent. Since the rubber composition of the invention only needs mixing protein and does not employ the conventional curing agents such as sulfur, it will not do any harm to human bodies.

In addition, if protein is mixed with the conventional vulcanized rubber composition, the modulus of the vulcanized rubber may be improved even further.

In order to manufacture the vulcanized rubber products according to the present invention, a protein and a curing agent are mixed into a rubber latex, and subsequently the resultant mixture is molded and vulcanized. In this case, the above aqueous protein solution containing 1 to 20 parts by weight of protein in solid is mixed with the rubber latex containing 100 parts by weight of rubber in solid, and then dried, molded and vulcanized. It is preferable that the aqueous protein solution is mixed with the above latex rubber at a ratio of 1 to 20 parts by weight of protein in solid to 100 parts by weight of rubber in solid, and the resultant mixture is subsequently mixed with a curing agent, dried, molded and vulcanized.

It has been known that if a small amount of casein, normally by about 0.1 part by weight, is added to natural rubber latex, the mechanical stability of the rubber is enhanced. The mechanical stability means a property of not being coagulated by mechanical shock or the like during production process. However, a fact that mixing 1 to 20 parts by weight of protein in solid to 100 parts by weight of rubber will enhance the strength or modulus of 10 the rubber product is not yet known in the related field prior to the present invention.

DETAILED DESCRIPTION OF THE INVENTION

Examples of protein preferably used by the invention include keratin and/or casein, and keratin is particularly preferred. The reason may be that because keratin contains a lot of SH groups, strength of the rubber can be enhanced by cross-linking between the SH groups and rubber molecules.

The type of rubber used by the invention is not particularly limited. Preferable examples of the rubber may include natural rubber, chloroprene rubber, isoprene rubber, acrylonitrile-butadiene rubber, styrene-butadiene rubber and the like.

These rubbers may be unvulcanized or may contain a curing agent. As described above, however, if the rubber product is used in direct contact with the human body, it is preferable to use the unvulcanized rubber or a low-density vulcanized rubber mixed with a minimum allowable amount of the curing agent that may not affect the human body. On the other hand, if the rubber is used as industrial materials which may not come in contact with the human body and which require even higher strength, the curing agent such as sulfur may be added.

The unvulcanized rubber products of the invention may include those in which protein bridges among rubber molecules to a certain extent. Those unvulcanized rubber products significantly differ from the conventional rubbers by sulfur cure in the method and extent of bridging.

A preferable mixing ratio of protein according to the invention is 1 to 20 parts by weight to 100 parts by weight of rubber. If the mixing ratio of the protein is lower than 1 part by weight, there is no effect of adding the protein, and therefore the strength of the rubber cannot be improved. If the mixing ratio of the same is more than 20 parts by weight, the amount of protein solution becomes excessive with less solid material therein. This will result in lower workability of the rubber or longer hours for drying process, incurring loss increase.

As described above, to produce the rubber products using the rubber composition of the invention, a deter- mined amount of an aqueous protein solution is added to rubber latex, and the resultant mixture is dried and molded. The rubber latex is normally made anionic so that colloid may be stably dispersed. To make the latex of natural rubber anionic, ammonia may be added, and to make the latex of synthetic rubber anionic, ammonia or potassium hydroxide may be added.

To produce the vulcanized rubber or low-density vulcanized rubber, an aqueous protein solution is added to the rubber latex and then further a curing agent is added. The example of sulfur cure agents may include sulfur and sulfide such as 4,4'-dithiomorpholine, dipentamethylenethiuram tetrasulfide and the like. The example of vulcanization accelerators may include amines such as hexamethylenetetramine and n-butylaldehyde aniline; guanidines such as diphenylguanidine and di-o-tolylguanidine; and sulfides such as N,N'-diphenylthiourea, N,N'-diethylthiourea, dibutylthiourea, dilaurylthiourea, mercaptobenzothiazole, sodium salt, zinc salt or cyclohexylamine salt of mercaptobenzothiazole, dibenzothiazole disulfide, tetramethylthiuram disulfide, tetraethylthiuram disulfide, tetrabutylthiuram disulfide, tetramethylthiuram monosulfide, dipentamethylenethiuram tetrasulfide, piperidine pentamethylenedithiocarbamate, sodium diethyldithiocarbamate, sodium dibutyldithiocarbamate, zinc dimethyldithiocarbamate, zinc diethyldithiocarbate, zinc dibutyldithiocarbamate, and zinc N-ethyl-N-phenyldithiocarbamate. Further, activating agents such as zinc oxide, lead oxide and magnesium oxide may be added.

The example of peroxide curing agents may include p-quinone dioxime, p,p'-dibenzoyl quinone dioxime and 4,4'-dithiodimorpholine.

The mixing ratio of said curing agents used for sulfur cure or peroxide cure is not especially specified and mixing it by 0.5 to 2 parts by weight to 100 parts by weight of rubber is satisfying.

The example of radiation curing agents may include bifunctional monomers having two double bonds in one molecule such as 1,3-butyleneglycolacrylate, 1,3-butyleneglycol dimethacrylate, 1,6-hexaneglycol diacrylate and 1,6-hexaneglycol dimethacrylate, neopentylglycol diacrylate, neopentylglycol dimethacrylate; and monofunctional monomers having one double bonds in one molecule such as ethylacrylate, n-butylacrylate, n-hexylacrylate and 2-ethylhexylacrylate. A mixing ratio of the curing agents used for radiation cure is 1 to 20 parts by weight, preferably 2 to 10 parts by weight to 100 parts by weight of rubber.

According to the rubber composition and the method of producing using the same composition of the invention, the unvulcanized rubber is mixed with a determined amount of protein to produce the rubber products which are strong enough for practical use and harmless to the human body. Therefore, the rubber may be preferably applicable to artificial organs, gloves, condoms and catheters, which are used in direct contact with the human body, requiring high strength. Further according to the invention, the rubber products may be readily produced by mixing rubber latex with the aqueous protein solution. The present invention is advantageous in eliminating the need of a large-scale vulcanizing equipment because it does not need the vulcanization process as required by the conventional methods.

Combined use of the curing agent and protein may achieve higher modulus than using the curing agent alone.

EXAMPLES

Referring to Examples of the invention, the rubber composition of the invention will be described in details.

EXAMPLE 1

1.0 part by weight of water-soluble keratin in solid was mixed with 100 parts by weight of natural rubber latex containing 0.7% by weight of ammonia. The resultant mixture was poured onto a glass plate to be dried and molded at room temperatures, and thus was obtained a 0.3 mm thick film. The film is in unvulcanized state not containing the curing agent such as sulfur.

The water-soluble keratin which was used in this example was prepared by a method presented at "2 A247 Lecture of the 63th Annual Meeting of the Chemistry Society of Japan in Spring." That is, wool was shaken with 8M urea, a reducing agent (2-mercaptoethanol) and a surfactant, at 50° C. for 12 hours. After filtering, the mixture was dialyzed through cellophane tube to obtain an aqueous keratin solution. The ratio of keratin contained in this aqueous solution was about 2 to 3%.

EXAMPLE 2

A 0.3 mm thick film was obtained by the same manner as in Example 1 except that 2.5 parts by weight of water-soluble keratin in solid was mixed with 100 parts by weight of natural rubber latex.

EXAMPLE 3

A 0.3 mm thick film was obtained by the same manner as in Example 1 except that 5.0 parts by weight of water-soluble keratin in solid was mixed with 100 parts by weight of natural rubber latex.

EXAMPLE 4

A 0.3 mm thick film was obtained by the same manner as in Example 1 except that 10.0 parts by weight of water-soluble keratin in solid was mixed with 100 parts by weight of natural rubber latex.

EXAMPLE 5

A 0.3 mm thick film was obtained by the same manner as in Example 1 except that 20.0 parts by weight of water-soluble keratin in solid was mixed with 100 parts by weight of natural rubber latex.

EXAMPLE 6

A 0.3 mm thick film was obtained by the same manner as in Example 1 except that 5.0 parts by weight of water-soluble keratin in solid was mixed with 100 parts by weight of chloroprene rubber latex produced by Denka Co., Ltd.

EXAMPLE 7

A 0.3 mm thick film was obtained by the same manner as in Example 1 except that 5.0 parts by weight of water-soluble keratin in solid was mixed with 100 parts by weight of isoprene rubber latex produced by Sumitomo Seika Chemicals Co., Ltd.

EXAMPLE 8

A 0.3 mm thick film was obtained by the same manner as in Example 1 except that 5.0 parts by weight of water-soluble keratin in solid was mixed with 100 parts by weight of acrylonitrile-butadiene rubber latex produced by Nippon Zeon Co., Ltd.

EXAMPLE 9

A 0.3 mm thick film was obtained by the same manner as in Example 1 except that 5.0 parts by weight of water-soluble keratin in solid was mixed with 100 parts by weight of styrene-butadiene rubber latex produced by Nippon Zeon Co., Ltd.

EXAMPLE 10

An aqueous casein solution containing 1.0 part by weight of casein in solid was mixed with 100 parts by weight of natural rubber latex containing 0.7% by weight of ammonia. The resultant mixture was poured onto a glass plate to be dried and molded at room temperatures, and thus was obtained a 0.3 mm thick film. The film is in unvulcanized state not containing the curing agent such as sulfur.

A casein solution was prepared by dissolving solid casein in aqueous ammonia.

EXAMPLE 11

A 0.3 mm thick film was obtained by the same manner as in Example 10 except that a solution containing 2.5 parts by weight of casein in solid was mixed with 100 parts by weight of natural rubber latex.

EXAMPLE 12

A 0.3 mm thick film was obtained by the same manner as in Example 10 except that a solution containing 5.0 parts by weight of casein in solid was mixed with 100 parts by weight of natural rubber latex.

EXAMPLE 13

A 0.3 mm thick film was obtained by the same manner as in Example 10 except that a solution containing 10.0 parts by weight of casein in solid was mixed with 100 parts by weight of natural rubber latex.

EXAMPLE 14

A 0.3 mm thick film was produced by the same manner as in Example 10 except that a solution containing 20.0 parts by weight of casein in solid was mixed with 100 parts by weight of natural rubber latex.

EXAMPLE 15

A 0.3 mm thick film was obtained by the same manner as in Example 10 except that a solution containing 5.0 parts by weight of casein in solid was mixed with 100 parts by weight of chloroprene rubber latex produced by Denka Co. Ltd.

EXAMPLE 16

A 0.3 mm thick film was obtained by the same manner as in Example 10 except that a solution containing 5.0 parts by weight of casein in solid was mixed with 100 parts by weight of isoprene rubber latex produced by Sumitomo Precision Chemical Co., Ltd.

EXAMPLE 17

A 0.3 mm thick film was obtained by the same manner as in Example 10 except that an aqueous solution containing 5.0 parts by weight of casein in solid was mixed with 100 parts by weight of acrylonitrile-butadiene rubber latex produced by Nippon Zeon Co., Ltd.

EXAMPLE 18

A 0.3 mm thick film was obtained by the same manner as in Example 10 except that an aqueous solution containing-5.0 parts by weight of casein in solid was mixed with 100 parts by weight of styrene-butadiene rubber latex produced by Nippon Zeon Co., Ltd.

COMPARATIVE EXAMPLE 1

Natural rubber latex containing 0.7% by weight of ammonia was poured onto a glass plate to be dried and molded at room temperatures, and thus was obtained a 0.3 mm thick film.

COMPARATIVE EXAMPLE 2

Chloroprene rubber latex produced by Denka Co., Ltd. was poured onto a glass plate to be dried and molded at room temperatures, and thus was obtained a 0.3 mm thick film.

COMPARATIVE EXAMPLE 3

Isoprene rubber latex produced by Sumitomo Precision Chemical Co., Ltd. was poured onto a glass plate to be dried and molded at room temperatures, and thus was obtained a 0.3 mm thick film.

COMPARATIVE EXAMPLE 4

Acrylonitrile-butadiene rubber latex produced by Nippon Zeon Co., Ltd. was poured onto a glass plate to be dried and molded at room temperatures, and thus was obtained a 0.3 mm thick film.

COMPARATIVE EXAMPLE 5

Styrene-butadiene rubber latex produced by Nippon Zeon Co., Ltd. was poured onto a glass plate to be dried and molded at room temperatures, and thus was obtained a 0.3 mm thick film.

EVALUATION TEST

The films obtained by the Examples and Comparative Examples were cut into JIS-4 dumbbell specimens, which were subject to a tensile test in accordance with JIS-K 6301 to measure the strength at break of each of the Examples and Comparative Examples. In the test, 3 samples for each Example or Comparative Example were measured, and the measurements were stated in the order of higher values as $S_1 \geq S_2 \geq S_3$. The average value was found by the following expression.

Strength at break = $0.7S_1 + 0.2S_2 + 0.1S_3$

The measurement values are given in Table 1.

TABLE 1

| | Type of rubber | Mixing ratio of protein | | Tensile strength at break (MPa) |
|---|---|---|---|---|
| | | Type | Amount (parts by weight) | |
| Example No. | | | | |
| Example 1 | Natural rubber | Keratin | 1.0 | 7.2 |
| Example 2 | Natural rubber | Keratin | 2.5 | 8.9 |
| Example 3 | Natural rubber | Keratin | 5.0 | 2.4 |
| Example 4 | Natural rubber | Keratin | 10.0 | 16.3 |
| Example 5 | Natural rubber | Keratin | 20.0 | 22.2 |
| Example 6 | Chloroprene rubber | Keratin | 5.0 | 9.0 |
| Example 7 | Isoprene rubber | Keratin | 5.0 | 3.6 |
| Example 8 | Acrylonitrile-butadiene rubber | Keratin | 5.0 | 8.8 |
| Example 9 | Styrene-butadiene rubber | Keratin | 5.0 | 4.3 |
| Example 10 | Natural rubber | Casein | 1.0 | 8.3 |
| Example 11 | Natural rubber | Casein | 2.5 | 8.7 |
| Example 12 | Natural rubber | Casein | 5.0 | 9.9 |
| Example 13 | Natural rubber | Casein | 10.0 | 10.9 |
| Example 14 | Natural rubber | Casein | 20.0 | 12.8 |
| Example 15 | Chloroprene rubber | Casein | 5.0 | 6.2 |
| Example 16 | Isoprene rubber | Casein | 5.0 | 3.2 |
| Example 17 | Acrylonitrile-butadiene rubber | Casein | 5.0 | 3.1 |
| Example 18 | Styrene-butadiene rubber | Casein | 5.0 | 3.0 |
| Comparative Example No. | | | | |
| Example 1 | Natural rubber | — | — | 6.4 |
| 2 | Chloroprene rubber | — | — | 5.9 |
| 3 | Isoprene rubber | — | — | 0.4 |
| 4 | Acrylonitrile-butadiene rubber | — | — | 2.9 |
| 5 | Styrene-butadiene rubber | — | — | 1.3 |

As shown in Table 1, the films obtained by Examples 1 to 18, containing protein therein, have higher strength at break than those of Comparative Examples 1 to 5. The higher mixing ratio of protein gives the higher strength at break.

EXAMPLES 19 to 28 (sulfur cure)

Casein or keratin was mixed with 100 parts by weight of natural rubber latex in ratios given in Table 2. Then, 1.0 part by weight of sulfur as well as 1.0 part by weight of zinc oxide as curing agents, and 0.6 part by weight of dibutylthiocarbamate as a vulcanizing accelerator were added. The resultant mixture was left to dry for 24 hours at a room temperature of about 30° C., and thus was obtained a 0.3 mm thick dry film.

Each of the films of Examples 19 to 28 was cut into a JIS-4 dumbbell specimen for measuring modulus ($M_{300}$ and $M_{500}$) at elongations of 300% and 500%. For comparison, the same test was conducted on the natural rubber not containing protein. The results are shown in Table 2.

TABLE 2

| Example No. | Mixing ratio of protein | | $M_{300}$ (kgf/cm$^2$) | $M_{500}$ (kgf/cm$^2$) |
|---|---|---|---|---|
| | Type | Amount (parts by weight) | | |
| Example 19 | Casein | 1.0 | 11.6 | 26.2 |
| Example 20 | Casein | 2.5 | 13.4 | 33.9 |
| Example 21 | Casein | 5.0 | 19.5 | 48.4 |
| Example 22 | Casein | 10.0 | 33.8 | 83.2 |
| Example 23 | Casein | 20.0 | 49.2 | 126.0 |
| Example 24 | Keratin | 1.0 | 11.3 | 25.4 |
| Example 25 | Keratin | 2.5 | 13.0 | 29.3 |
| Example 26 | Keratin | 5.0 | 16.4 | 48.0 |
| Example 27 | Keratin | 10.0 | 26.7 | 78.3 |
| Example 28 | Keratin | 20.0 | 34.5 | 18.1 |
| Control | — | — | 10.4 | 20.8 |

Table 2 shows that mixing 5 phr of protein will increase the modulus to more than twofold of that of Control not containing protein.

What is claimed is:

1. An unvulcanized rubber composition consisting essentially of 100 parts by weight of rubber latex and 2.5 to 20 parts by weight of unhydrolyzed keratin.

2. A method of producing rubber products which comprises:

mixing an aqueous solution containing 2.5 to 20 parts by weight, as solids, of keratin with a rubber latex containing 100 parts by weight of rubber, as solids, and then drying and molding the resultant mixture.

* * * * *